United States Patent
Meise et al.

(10) Patent No.: US 10,711,826 B2
(45) Date of Patent: Jul. 14, 2020

(54) CABLE ASSEMBLY FOR USE WITH A VEHICLE

(71) Applicant: Ford Global Technologies, LLC, Dearborn, MI (US)

(72) Inventors: Philipp Meise, Köln (DE); Ivan Jan Mathieu Ernest Bruggen, Riemst Limburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,910

(22) Filed: Jan. 20, 2017

(65) Prior Publication Data

US 2017/0211609 A1 Jul. 27, 2017

(30) Foreign Application Priority Data

Jan. 22, 2016 (DE) .......................... 10 2016 200 880

(51) Int. Cl.
*F16C 1/10* (2006.01)
*F16C 1/20* (2006.01)
*F16C 1/22* (2006.01)
*B60T 11/04* (2006.01)

(52) U.S. Cl.
CPC .................. *F16C 1/10* (2013.01); *F16C 1/20* (2013.01); *F16C 1/223* (2013.01); *B60T 11/046* (2013.01); *F16C 2361/45* (2013.01)

(58) Field of Classification Search
CPC .... F16C 1/10; F16C 1/102; F16C 1/12; F16C 1/26
See application file for complete search history.

(56) References Cited

U.S. PATENT DOCUMENTS

| | | | |
|---|---|---|---|
| 3,744,339 A | 7/1973 | Martinson | |
| 4,991,700 A * | 2/1991 | Koga | F16H 59/10 |
| | | | 192/220.3 |
| 5,156,063 A * | 10/1992 | Kelley | F16C 1/14 |
| | | | 403/197 |
| 2010/0139443 A1* | 6/2010 | Choi | F16C 1/108 |
| | | | 74/502.5 |
| 2011/0041644 A1 | 2/2011 | Choi et al. | |

FOREIGN PATENT DOCUMENTS

| | | |
|---|---|---|
| JP | 2001159417 A | 6/2001 |
| WO | WO9709538 | 3/1997 |

* cited by examiner

*Primary Examiner* — Richard W Ridley
*Assistant Examiner* — Brian J McGovern
(74) *Attorney, Agent, or Firm* — Raymond L. Coppiellie; Burgess Law Office, PLLC

(57) ABSTRACT

A Bowden cable, including a cable transmitting tensile force from an operator side to an active side and a sheath guiding the cable, and a retention device arranged at an end side of the sheath limiting movement of the cable with respect to the sheath in the direction of the operator side. The retention device operative to allow movement of the cable with respect to the sheath when a tensile force acting between the cable and sheath exceeds a threshold value.

11 Claims, 2 Drawing Sheets

CABLE ASSEMBLY FOR USE WITH A VEHICLE

CROSS-REFERENCE TO RELATED APPLICATIONS

Not Applicable.

BACKGROUND OF THE INVENTION

1. Field of the Invention

The invention relates to a Bowden cable, in particular a cable having a retention feature.

2. Description of Related Art

Bowden cables are used in various fields of technology. In general, a Bowden cable is a cable guided inside a bendable sheath and displaced in the longitudinal direction with respect to the sheath. The cable transmits a force, for example, from an operating lever to a remote device. Known fields of application of Bowden cables are, for example, brakes or gearshifts on bicycles, but also, for example, engines or brakes in a wide variety of motor vehicles.

Motor vehicles such as passenger vehicles or trucks typically include a parking brake, for example, a hand brake, actuated by a Bowden cable. The cable of the Bowden cable has, as many other cables, a nipple, lug, or a spherical head securely connected to the cable end at the brake-side end. For example, when use with a disc or drum brake, one end of the cable has a positive-locking connection with a component of the disc or drum. However, when the Bowden cable is connected or fitted to the component, undesirable displacement of the cable with respect to the sheath could occur. The displacement resulting from a force directed away from the brake onto the cable. This may occur in particular when the force required to introduce the cable into a securing mechanism and to engage it at that location is greater than the normal, rather low friction force between the cable and the sheath. When connecting the Bowden cable to a component a worker receives, resulting from the connection or engagement operation, a tactile or acoustic feedback relating to the completed installation of the Bowden cable. However, during the connection or engagement operation, the relative position of the cable and sheath cannot change in an uncontrolled manner. Consequently, when used with a brake assembly, the Bowden cable is secured to the drum before the drum is installed. Wherein the Bowden cable is connected to the drum and subsequently the drum is installed.

SUMMARY OF THE INVENTION

A cable assembly including a sheath and a cable guided in the sheath for longitudinal movement in the direction of the sheath. The assembly has a cylindrically shaped retention element having a cavity, an arm portion, and a side portion. With the side portion having an inner face and an outer face. An opening in the side portion extends between the inner face and the outer face. A stop element is connected to the cable and disposed in the cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
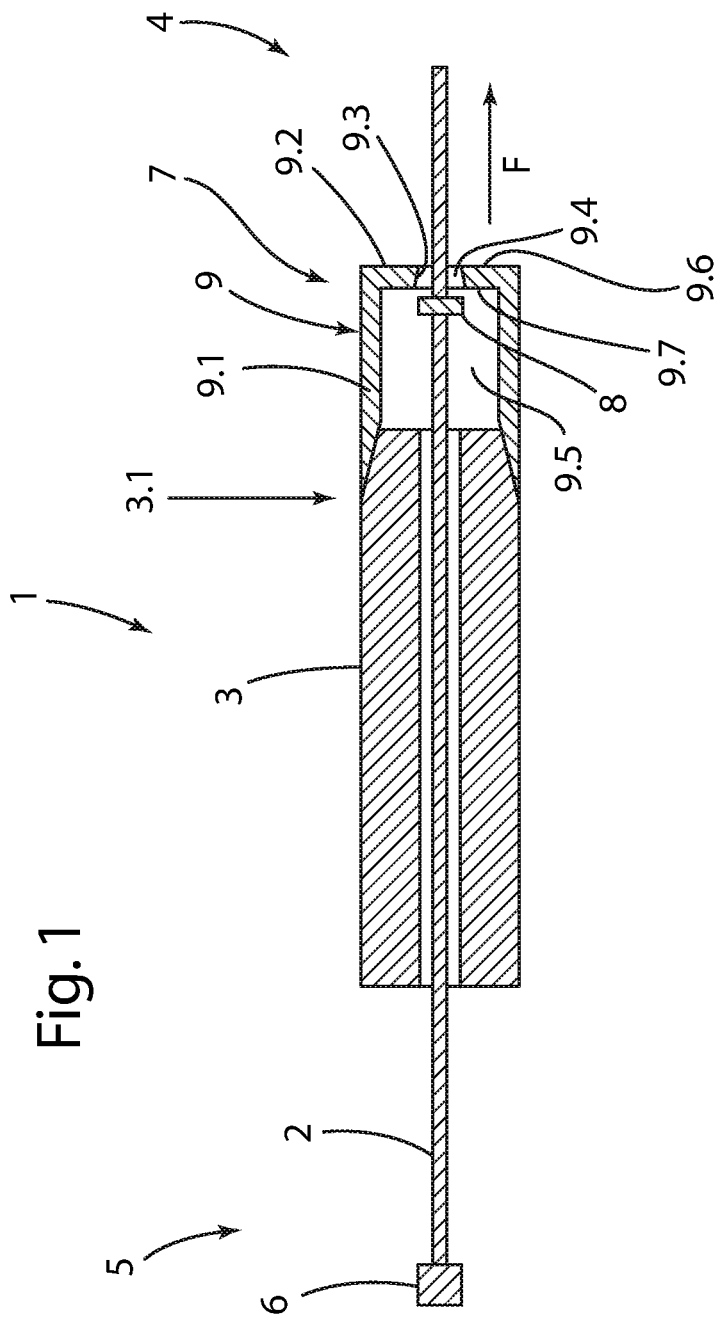
FIG. 1 is a cross section of a Bowden cable according to the invention in a first position.

FIG. 1 is a schematic cross sectional illustration of a Bowden cable 1 according to the invention for installation in a parking brake, for example, in a hand brake, of a passenger vehicle. A portion of a cylindrical cable 2, for example, a solid or stranded steel wire, is arranged in a cylindrical sheath 3 that guides the cable 2. One end of the cable 2 connects to and transmits a tensile force from an operator side 4, on which an operating lever of the hand brake, not illustrated, is located to an opposite end of the cable 2 that connects to an active side 5 on which a drum or disc brake, also not illustrated, is located. A nipple or cable lug 6 connected to the end of the cable 2, associated with the active side 5, engages the brake producing a positive-locking connection to the brake enabling the lever to transmit a tensile force F to the brake.

To prevent the tensile force F, acting in the direction of the operator side 4, from causing an excessive displacement of the cable 2 with respect to the sheath 3 when connecting the cable 2 to the brake a retention device 7, including stop element 8, is provided at an operator-side end 3.1 of the sheath 3.

The retention device 7 includes a sleeve-like retention element 9 arranged in a peripheral manner with respect to the cable 2 and securely connected at an end thereof to the sheath 3. The retention element 9 includes a cylindrical body portion 9.1 extending parallel to the cable 2 and defining an inner space or cavity 9.5. The retention element 9 also includes a side portion 9.2 extending substantially perpendicular to the body portion 9.1 and having an opening 9.4 extending there through. As shown, the cable 2 extends through the opening 9.4.

The stop element 8 is a cylindrically shaped element pressed onto or secured to the cable 2. As illustrated in FIG. 1, the cylindrical stop element 8 is positioned in the inner space or cavity 9.5.

The opening 9.4 is circular and includes a conical guiding face 9.3 tapering inward, in the direction of the operator side 4, in an oblique manner toward the cable 2. The minimum radius of the opening 9.4 is adjacent the outer face 9.6 of the side portion 9.2 such that the conical guiding face 9.3 tapers inward from the inner face 9.7 of the side portion 9.2 toward the outer face 9.6.

As shown in FIG. 1 the minimum radius or minimum inner diameter of the opening 9.4, is smaller than the radius or outer diameter of the stop element 8. Consequently, the stop element 8 cannot pass in an unimpeded manner through the opening 9.4

However, the retention element 9 is formed of a material, for example a plastic, having resilience. If the stop element 8 moves, because of the tensile force F, towards the operator side 4 it contacts the conical guiding face 9.3 starting at the inner face 9.7 of the side portion 9.2. The retention element 9 having enough resiliency to impede or limit further movement of the stop element 8. The resilience of the retention element 9 selected such that, under the action of the forces that typically occur during the installation of the Bowden cable 1, any outward movement, deflection or deformation generated by the stop element 8 engaging the conical guiding face 9.3 is insignificant and the stop element 8 cannot pass through the opening 9.4.

If, during later adjustment of the hand brake, or during the first use thereof, a greater tensile force F is applied to the cable, with the sheath 3 secured to the vehicle in such a manner it cannot follow the movement of the cable 2, the retention element 9, in particular the side portion 9.2 which surrounds the opening 9.4, resiliently moves, bends, deflects or otherwise outwardly deforms enabling the stop element 8 to pass through the opening 9.4. The outward movement, deflection or deformation resulting from the stop element 8 engaging the oblique guiding face 9.3 wherein upon reaching a threshold value of the tensile force F, the retention element 9 outwardly deflects or deforms to an extent whereby the stop element 8 passes through the opening 9.4 to a position outside of the cavity 9.5.

Figure 2:
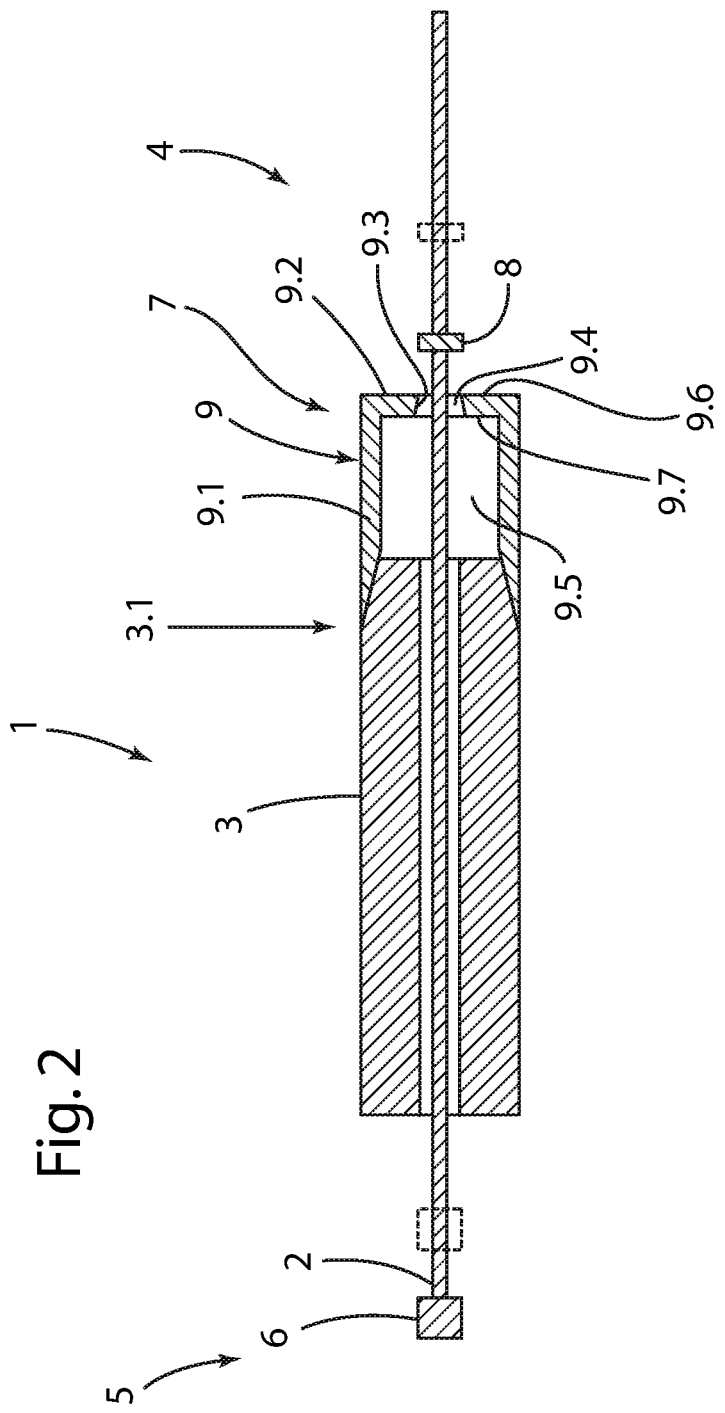
FIG. 2 is a cross section of the Bowden cable of FIG. 1 in a second position.

As illustrated in FIG. 2, the retention element 9 returns to its starting, non-deflected position. This position corresponds to the normal state of the Bowden cable 1, wherein one extreme position of the nipple 6 and the stop element 8 is illustrated with solid lines and the other extreme position is illustrated with dashed lines. The cable 2 moves between these extreme positions during the normal use of the hand brake.

The retention device 7 and the cable 2 can be effectively secured against undesirable displacements during installation while the retention device 7 does not impede the normal use of the Bowden cable 1. The retention device 7 can readily remain on the sheath 3 since it is generally constructed in a small and light manner.

A Bowden cable according to the disclosed example is suitable for a motor vehicle, and for a parking brake, for example, a hand brake of the motor vehicle. The exemplary Bowden cable may also be used for foot-activated parking brakes. Motor vehicles include passenger vehicles and trucks. As to the type of parking brake, for example the hand brake, there are no limitations in this context if it can be operated with a Bowden cable and may be a drum brake or a disc brake. The parking brake is referred to for reasons of simplicity as a hand brake, wherein a foot-actuated brake is naturally also intended to be included.

As disclosed, the cable may be constructed of a high strength material, including a steel or high strength polymer core optionally coated or covered to protect the core from corrosion, mechanical damage, or to reduce the friction with respect to the sheath. The cable may also be referred to as a Bowden cable core, pulling cable, inner wire, or inner cable. Normally, the cable has a substantially circular cross-section. The operator side is the side from which the Bowden cable is operated, in the case of a hand brake of a motor vehicle, the side facing the lever of the hand brake. The active side is the side facing the component to which the force is applied, in the above-mentioned case, the brake. The term tensile force refers to a force F acting in the cable in the direction of the operator side.

The sheath, also called a Bowden cable sheath or cable sheath, may be constructed in any known manner. For example, as a helical sheath, compression-free sheath or member-like sheath. The sheath is flexible with respect to bending torques acting transversely relative to the extension direction thereof while being comparatively pressure-resistant or incompressible with respect to forces in the longitudinal direction. Necessary stability can be produced with metal elements arranged inside the sheath. For example, one or more metal coils, metal wires extending in the longitudinal direction, or a series of annular metal elements surrounded by a plastic cover. Generally, the sheath is cylindrical or in the form of a cylinder cover having a substantially circular cross-section.

The cable is guided inside the sheath or the sheath guides the cable. As conventional with a Bowden cable, it is not generally the entire cable but instead only a portion thereof arranged inside the sheath, while the cable at the operator side and/or at the active side protrudes from the sheath. For example, in the operating state the cable, or a portion thereof, is arranged loosely within the sheath, wherein the sheath predetermines the path of the cable. The cable can be displaced in known manner in the longitudinal direction inside the sheath. In one example, a sliding tube is arranged between the sheath and cable. The sliding tube may be formed of, for example, PTFE, which may also form the innermost layer of the sheath.

In the exemplary embodiment, the Bowden cable has a retention device 7 arranged at an end of the sheath to limit movement of the cable with respect to the sheath in the direction of the operator side and constructed to release the movement of the cable when a tensile force acting between the cable and sheath exceeds a threshold value. The tensile force acts on the cable in the direction of the operator side and between the cable and sheath, the tensile force pulls the cable away from or through the sheath. If the sheath moves freely, so that no restoring forces impede it, a force cannot develop between the cable and sheath since the sheath follows the movement of the cable. However, if the sheath is, for example, secured to a vehicle, a restoring force is developed and consequently a tensile force acts between the cable and sheath.

The retention device 7 is arranged at the end side of the sheath. The term end side means a position on at least one end with respect to the extension direction of the sheath and the cable. This is advantageous in that the sheath can, at least for the most part, be produced in a conventional manner and there is a modification only in the region of one or optionally both ends since the retention device 7 is arranged at that location.

The retention device 7 limits the movement, wherein the cable cannot move in an unimpeded manner in the direction mentioned. It is possible for movement or play to remain for the cable, but also for the cable to be secured with respect to the sheath if the threshold value is not exceeded. The release means that the retention device is configured to release the movement of the cable in the direction of the operator side when the threshold value is exceeded and no longer limit or prevent the movement.

This enables, for example, when assembling a hand brake, in which the force acting in the direction of the operator side is at least limited in order of magnitude, and consequently remains within a limited range, prevention of an undesirable displacement of the cable. After the installation, when the brake is adjusted or when it is first used, it applies greater forces wherein the threshold value is exceeded, leading to the retention device 7 releasing the cable. Using the Bowden cable according to the invention in a hand brake of a motor vehicle is the main area of use, but the Bowden cable may also be found to be advantageous with other technical applications.

The threshold value need not be precisely predetermined, however, it should be sufficiently low to allow a normal use of the Bowden cable, but sufficiently high, such that undesirable displacement cannot occur between the cable and the sheath before the Bowden cable is used.

It is preferable for the retention device to be arranged at the operator-side end of the sheath, the end facing the operator side of the Bowden cable. This configuration is advantageous because at the active side there may not be enough structural space for the retention device 7 or it could be obstructive when installing the Bowden cable. Specific embodiments, may also be more readily implemented when the retention device 7 is arranged at the side at which the cable 2 is pulled with respect to the sheath 3.

In an alternative embodiment, the retention device 7 could have one or more desired breaking locations that give way when the threshold value is exceeded to allow movement of the cable. For example, the sheath is connected to the cable by a connection web that tears or breaks when the threshold value provided is exceeded; however, in one embodiment the retention device 7 release the movement of the cable in a non-destructive manner and no component has to be damaged or destroyed. This may be advantageous because with a non-destructive release, the threshold value provided can often be more readily complied with and there is little risk that any component that breaks away may reach a location where it blocks or impairs the Bowden cable itself or another device.

As shown, the retention device 7 includes a stop element 8 secured to the cable 2 and at least one retention element 9 secured to the sheath 3 and cooperating with the stop element 8. The stop element 8 secures the cable 2 against displacements in the longitudinal direction of the cable 2. Normally, it is secured against displacements of any type, wherein a positive-locking, non-positive-locking and/or materially integral connection may be present. The stop element 8 may, for example, be clamped, adhesively bonded, or soldered to the cable. It is possible to use all methods known for securing an end-side nipple or cable lug to the cable 2. The stop element 8 increases the transverse dimension with respect to the cable.

The stop element 8 may be constructed to extend around the cable 2 and may optionally have a circular cross-section forming a collar or flange on the cable 2. Depending on the embodiment, the stop element 8 does not need great stability and may optionally be produced from plastic instead of, for example, from metal. Since the stop element 8 normally remains on the cable 2, it is advantageous that it extends only over a relatively short portion of the cable 2 to not impair the flexibility thereof. It may, for example, extend over a length corresponding to a maximum of five times the diameter of the cable, preferably a maximum of twice the diameter, more preferably a maximum of the identical diameter.

The retention element 9 connects to the sheath 3 and is secured with respect to displacement in the longitudinal direction. In one embodiment, the retention element is secured against displacements of any type, by a positive-locking, non-positive-locking and/or materially integral connection. The retention element 9 can be constructed in an at least partially integral manner with the sheath 3.

The stop element 8 and the retention element 9 cooperate with each other, as the retention element 9 forms a stop for the stop element 8. The retention element 9 stops the movement of the stop element 8 if a displacement of the cable 2 occurs with respect to the sheath 3. When the cable 2 is displaced in the direction of the operator side 4, the stop element 8 engages the retention element 9 and cable 2 movement continues only when at least one element mentioned becomes deformed or destroyed. The retention element 9, arranged at least partially at the operator side 4, retains the stop element 8, as long as the threshold value has not been exceeded thereby releasing and allowing movement of the cable 2.

Preferably, at least one of the stop element 8 and retention element 9 is constructed in a resilient manner whereby interaction between the corresponding elements causes one to deform, wherein the resilience produces a restoring force limiting movement of the cable. The magnitude of a resilient deformation, linear or non-linear, increases with the active force so that, when the threshold value is exceeded, the deformation also exceeds a specific magnitude. The stop element 8 and the at least one retention element 9 are adapted to each other in shape in such a manner that, during the corresponding deformation the cable is released and moves. It is preferable for the retention element 9 to be constructed in a resilient manner, while the stop element 8 is constructed in a rigid manner so that, during interaction with the retention element 9, it is not subjected to any plastic or resilient deformation. The retention element 9 may be formed of materials such as plastic, rubber, and spring steel, where applicable.

In the exemplary embodiment, the retention element 9 has a guiding face 9.3 tapering at the operator side in an oblique manner in the direction toward the cable 2. The guiding face 9.3 neither extends perpendicularly to nor parallel with the cable 2, but instead in an oblique manner relative thereto in such a manner that it approaches the cable 2 in the direction toward the operator side 4. The guiding face 9.3 forms a contact face with the other element in each case. The shaping ensures that, when the tensile force acts, a force acting transversely relative to the cable 2 results between the stop element 8 and the retention element 9 and presses the two elements apart. The face 9.3 guides the two elements away from each other, hence the term guiding face. The guiding face 9.3 need not be planar, but could form a portion of an outer cone surface. Guiding faces 9.3 may be provided both on the stop element 8 and on a retention element 9. However, it is enough for one element to have a guiding face.

According to an embodiment, the retention element 9 has a minimum spacing from a center axis of the sheath 3 smaller than a minimum extension of the stop element 8 transversely relative to a center axis of the cable 2. Normally, both the sheath and the cable are constructed in a rotationally symmetrical manner and a center axis can be defined in each case. Radial spacing can be established with respect to the center axis of the sheath. The mentioned minimum spacing of the stop element 8 relates to the portion of the stop element 8 having the smallest spacing. Accordingly, an expansion of the stop element 8 transversely relative to the center axis of the cable 2 can be determined and corresponds to the radial spacing of the outer edge of the stop element 8 from the center axis. The minimum expansion mentioned relates to the portion of the stop element having the smallest expansion. In this embodiment, regardless of a possible torsion of the cable with respect to the sheath, the retention element 9 prevents the movement of the stop element 8. The stop element 8 cannot pass the retention element 9 without contacting the retention element 9. Because the stop element 8 has a circular cross-section, the minimum expansion is the radius or the minimum spacing of the retention element 9 from the center axis of the sheath is smaller than the radius of the stop element 8. The retention element 9 blocks the path of the stop element 8.

According to a further embodiment, at least two retention elements are arranged to face each other with respect to the cable 2. The stop element 8 moves through and between the retention elements 9. The stop element 8 is effectively prevented from moving past a retention element 9, for example, without a substantial restoring force being produced.

According to another embodiment, a retention element extends partially around the cable 2. For example, the retention element may extend only partially around, for example, through 270° or 300°. With a peripheral retention element, portions thereof are arranged to face each other with respect to the cable, whereby a similar functionality is obtained as with the above-described embodiment. However, a single peripheral retention element is often more structurally stable than a plurality of individual elements. In the production process, it may be simpler to secure a single retention element to the sheath. Such a peripheral retention element surrounds the cable at least partially and is in this respect constructed in a sleeve-like or cover-like manner.

According to another embodiment, the retention element has an arm portion extending parallel with the cable and a side portion that extends therefrom in the direction toward the cable. The retention element constructed in a substantially L-shaped manner. The arm portion considered as extension arm extending from the sheath spacing the side portion from the end of the sheath. The stop element is arranged in the cavity or intermediate space produced between the end of the sheath and the side portion if the threshold value has not yet been exceeded. In this intermediate space, the stop element can move in an unimpeded manner and consequently a degree of play is provided for the cable with respect to the sheath, and allowing the stop element to move into abutment while the side portion. The side portion may have a guiding face as mentioned above. With an at least partially peripheral retention element, the arm portion may also be referred to as a cover portion since it extends partially around the cable and parallel therewith. It may be in the form of a cylindrical cover. The side portion may adjoin the cover portion in a similar manner to the covering face of a cylinder and may have a circular-ring-like shape. In this instance, there is provided in the center of the side portion a recess through which the stop element extends when the threshold value is exceeded. The guiding face may be formed at the edge of this recess or opening and has a conical shape, more specifically the shape of a truncated cone.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cable assembly comprising:
a sheath;
a cable guided in said sheath;
a retention element connected to said sheath, said retention element having a cylindrical body portion having a cavity and a resiliently deformable side portion having an inner face and an outer face, an opening in said side portion extending between said inner face and said outer face, said cable extending through said opening; and
a stop element connected to said cable and movable between a first position in said cavity, nearest to said inner face, and a second position out of said cavity, nearest said outer face, by a pulling force exerted on said cable.

2. The cable assembly of claim 1 wherein said opening is circular and has an inner diameter smaller than an outer diameter of said stop element whereby said stop element cannot pass in an unimpeded manner through said opening without deforming said side portion.

3. The cable assembly of claim 2 wherein said stop element is configured to to pass through said opening in a non-destructive manner.

4. The cable assembly of claim 1 wherein said retention element has a tapered guiding face.

5. The cable assembly of claim 1 wherein said opening is circular and includes a conical guiding face tapering inward from said inner face in an oblique manner toward said cable.

6. The cable assembly of claim 1 wherein said side portion surrounds said opening and resiliently deflects enabling said stop element to pass through said opening.

7. The cable assembly of claim 1 wherein said retention element extends at least partially around said cable.

8. The cable assembly of claim 1 the cylindrical body portion extends parallel with said cable and said side portion extends in a direction toward the cable.

9. A cable assembly comprising:
a sheath;
a cable guided in said sheath;
a retention element connected to said sheath, said retention element including a cylindrical body having a cavity and a resiliently deformable side portion having an inner face and an outer face, an opening in said side portion extending between said inner face and said outer face;
a stop element connected to said cable and movable between a first position nearer said inner face to a second position nearer said outer face, said stop element out of said cavity in said second position;
said opening is circular and includes a conical guiding face tapering inward from the inner face in an oblique manner toward the cable; and
wherein said opening has an inner diameter smaller than an outer diameter of said stop element whereby said stop element cannot pass in an unimpeded manner through the opening without deforming said opening.

10. The cable assembly of claim 9 wherein said side portion surrounds said opening and resiliently deflects enabling said stop element to pass through said opening.

11. The cable assembly of claim 9 wherein said stop element engages said side portion and said side portion had having a predetermined resiliency whereby said stop portion element acts on said side portion such that said side portion deflects outward away from said sheath when a pulling force exerted on said cable creates a tensile force acting between said cable and said sheath exceeds a threshold value.

* * * * *